Figure 4:
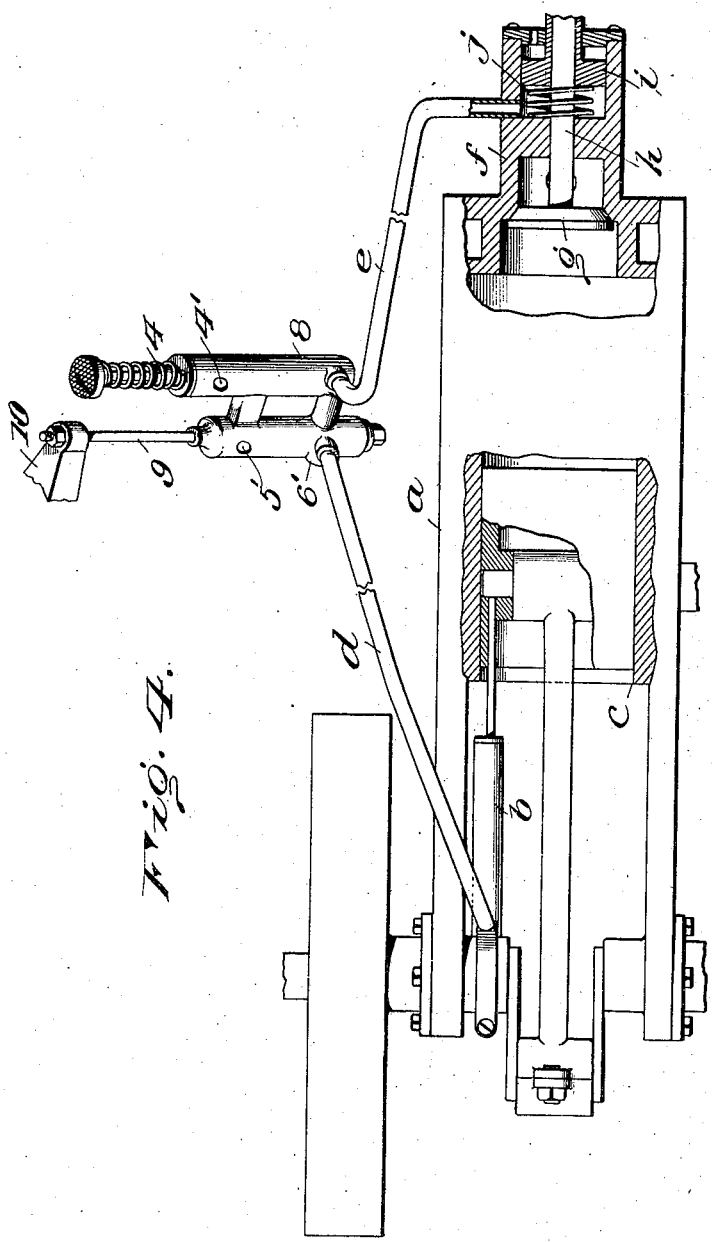

A. WINTON.
CONTROLLER FOR EXPLOSION ENGINES.
APPLICATION FILED FEB. 13, 1909.
1,124,987.
Patented Jan. 12, 1915.
2 SHEETS—SHEET 1.
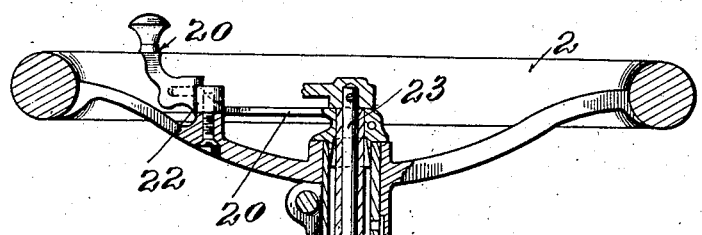
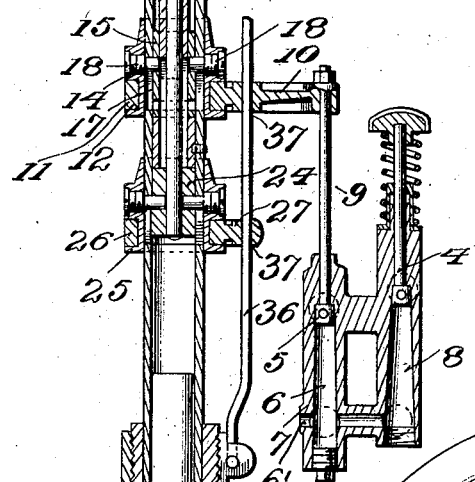
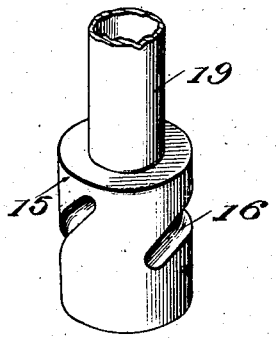
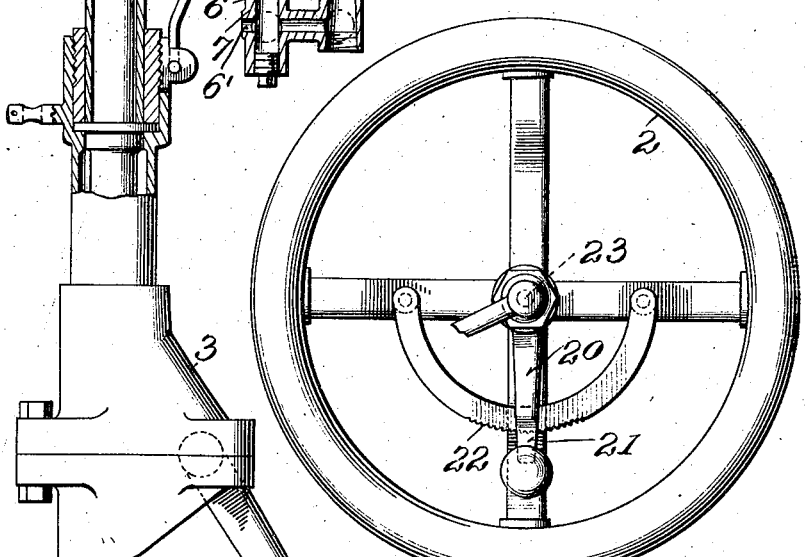
Witnesses
W. A. Williams
C. P. Wrigley, Jr.
Inventor
Alexander Winton
By A. S. Pattison,
Attorney

A. WINTON.
CONTROLLER FOR EXPLOSION ENGINES.
APPLICATION FILED FEB. 13, 1909.

1,124,987.

Patented Jan. 12, 1915.
2 SHEETS—SHEET 2.

WITNESSES

INVENTOR
Alexander Winton
By A. Pattison
Attorney

UNITED STATES PATENT OFFICE.

ALEXANDER WINTON, OF CLEVELAND, OHIO.

CONTROLLER FOR EXPLOSION-ENGINES.

1,124,987.

Specification of Letters Patent.  Patented Jan. 12, 1915.

Original application filed December 5, 1904. Serial No. 235,487. Divided and this application filed February 13, 1909. Serial No. 477,607.

*To all whom it may concern:*

Be it known that I, ALEXANDER WINTON, a citizen of the United States, residing at Cleveland, in the county of Cuyahoga and State of Ohio, have invented certain new and useful Improvements in Controllers for Explosion-Engines, of which the following is a specification, reference being had therein to the accompanying drawing.
This invention relates to improvements in controllers for explosion engines, especially intended for controlling explosion engines of motor driven vehicles, and is a division of my application, Serial No. 235,487, filed December 5th 1904.

The object of this invention is to provide a hand and a foot throttling control for the engine of a motor vehicle, the hand control extending to the normal position of the hand of the driver of the vehicle, and the foot control in position to be operated by the foot of the driver, both combined to conjointly control the throttling means of the engine.
In the accompanying drawings Figure 1 is a sectional view of my present invention, showing it in connection with a motor vehicle steering wheel-stem. Fig. 2 is a top plan view of the steering wheel. Fig. 3 is an enlarged detached perspective view of the cam which is used in the hand-controlling part of the present invention. Fig. 4 is a diagrammatic view of a single cylinder engine with the combined hand and foot control throttling mechanism.

For the purpose of illustration, my present improvement is here shown in connection with that form of engine throttling, in which the explosive inlet valve is limited in its opening movement to act as a throttle to control the explosive charge that is taken into the engine cylinder, and thus controlling the explosive force or power within the cylinder. The principle and operation of this system of throttling an explosion engine is disclosed and described in my U. S. Letters Patent Nos. 582,108 and 626,122, to which reference is here made.

The feature of my present invention is to combine a hand-controlled device with a foot controlled device, both of which act conjointly and independently upon the throttling means for the purpose of enabling the driver to instantly control the speed of the engine by either the hand or foot control, according to the convenience of the operator under the various situations of driving a motor vehicle, and according to the requirements of the load carrying or hill-climbing necessities, or exigencies of the peculiar conditions at the moment it is necessary to vary the speed of the engine and, therefore, vary the speed of the car. That is there are situations arising in the operation of a motor vehicle when it is necessary that both feet of the operator be used to control the vehicle, enabling one hand to be used for controlling the engine and the other the steering wheel, while there are situations and conditions requiring the use of only one foot of the operator, but requiring both hands for accurate and quick steering and at the same time with this improvement the foot control can be used for governing the speed of the car. So far as I am aware, this has not heretofore been accomplished.

Referring now to the drawings here used for illustrative purposes, 7 is a casting, which has air-passages 6 and 8, that are in communication with each other at their lower ends, the passages thus being in communication with an air-pump $b$ operated by the piston $c$ of the engine $a$ and a pipe $e$, which is in communication with the chamber $j$ in which the piston $i$ moves. This piston $i$ is fast to the stem $h$ of the combined explosive inlet valve and controlling element $g$. The air-pressure produced by the pump $b$ is forced into the chamber $j$ and serves to hold the valve $g$ seated or closed against the suction action of the piston $c$. The distance that this valve $g$ is permitted to open depends upon the amount of pressure against the piston $i$ which is connected with the said valve $g$, as above explained.

A foot actuated throttle controlling device 4 is provided, and in the throttling system here shown, it is in the form of a valve 4. A hand controlled device is combined with the foot controlled device and is here shown in the form of a valve 5. The foot controlled device 4 is located at the floor of the vehicle and at the foot position of the driver, whereas the hand device is operated from the hand-position of the driver, i. e., the steering wheel, by the following connections: The stem 9 of the hand controlled device 5 is suitably attached to the arm 10 and this arm 10 is formed as a part of or connected with a ring 11. This ring 11 is located in a groove 12 formed in a vertical movable sleeve 14, which surrounds the steering tube 1. Located within the steering tube 1 is a concentrically arranged oscillating sleeve 15, which is provided with spiral slots 16. The steering tube is provided with slots 17 and passing through the sleeve 14, the slots 17 and extending into the spiral cam-slots 16 are the screws or pins 18. The tube 19 is attached to the sleeve 15 and extends upward through the steering tube 1 and projects above the upper end thereof. Connected to the projecting end of the tube 19 is a handle 20, and this handle projects outward and is provided with a spring pressed pawl 21, adapted to engage a notched segment 22, attached to the steering-wheel 2.

When the steering wheel or tube are turned for guiding the vehicle, the sleeve 14 is turned therewith, and simply rotates within the concentrically arranged ring 11, without imparting any motion whatever to the ring and its arm 10. When, however, the handle 20 is moved or oscillated, thus causing the sleeve 14 to move up or down, according to the direction in which the lever or handle is moved, and correspondingly moves the hand-control throttle member 5, and thereby the throttling element of the engine, and in turn the power or speed of the engine and vehicle.

The valves 4 and 5 operate to control or throttle the engine, as described in my patents hereinbefore mentioned. The valves 4 and 5 control the throttle of the engine by permitting the escape of pressure from the pump $b$ and chamber $j$, and not by stopping the flow of pressure thereto. Normally the pressure of the pump enters the chamber $j$, and the valve $g$ would be held closed so that the engine would not receive an explosive charge, except that the hand controlled valve 5 is adjusted by the lever 20, so that there is constantly a slight escape of pressure through the escape opening 5'. In this way the speed of the engine when running idle is controlled, and the uniform speed of the engine when under load for steady running can be controlled by hand through the lever 20, by releasing the pressure from the chamber $j$, and in this way control the movement of the explosive inlet valve $g$. In the same way (by permitting an escape of the pressure from chamber $j$) the engine is controlled by the foot button or valve 4, by permitting escape of pressure through the opening 4', when both hands of the driver are engaged in operating the steering wheel, or the engine can be suddenly speeded by a pressure of the foot on the valve or button 4, and as suddenly retarded by releasing the foot-button, and in each case without the operator taking his hands from the steering wheel, all of which has been already explained herein.

By combining the freely movable hand and throttle controlling devices, so that they are common to and conjointly and independently act upon and control the engine throttling element, the driver can control the power and speed of the engine, and thereby the speed of the vehicle to meet the varying conditions, using either the hand or the foot controlling means, as may be most convenient or required.

The hand-throttling controlling member or device can be so placed by the operator as to meet the speed and load-carrying requirements, under which the engine is working; at any given time, and to, if desired, more suddenly control the engine throttling element for quickly increasing the power of the engine and the speed of the engine, the necessity for which is continuously arising, and especially in city use of motor vehicles; or decrease the speed of the hand device; and use either the hand or foot throttle-controlling device, or both simultaneously as conditions require, or the foot control leaving both hands for quick and accurate steering. In either case, the two controlling devices are common to and conjointly act to control the engine controlling element. The hand controlled device is more capable of a nice adjustment to meet the requirements of loading at any given time for the desired speed of road travel, since the foot of the operator is affected by the jar of a rough surface, whereas the foot controlled device is capable of more instant change and more sudden control of the engine, without the driver removing his hands from the steering wheel, which is frequently of the greatest advantage under conditions most likely to cause accident. The two, therefore, coöperate conjointly and independently act upon the engine throttling element to enable the driver to control the engine to meet the requirements of the load at the time, to control the motor suddenly without removing his hands from the steering wheel.

Having thus described my invention, what is claimed and desired to be secured by Letters Patent, is:—

1. In an automobile, the combination with an explosion engine throttling element, of a movable hand throttle regulating device, and a foot operated throttle regulating device, each of said devices arranged to independently operate the throttling element from a minimum position to a greater open position independently of each other, whereby with the two devices set at their minimum positions they are each movable independently to regulate the throttling element to a greater open position without moving the other device from its minimum position to vary the speed and power of the engine to meet the varying engine load under varying conditions.

2. In an automobile, the combination with an explosion engine throttling element, of a movable hand throttle regulating device, and a movable foot throttle regulating device, each adapted to regulate independently the throttling element from minimum to maximum upon said throttle to vary the speed and power of the engine to meet the variable engine load under varying conditions.

3. In an automobile, the combination with an explosion engine throttling element of separately operative hand and foot throttle regulating devices, one of said devices adapted to be adjusted to control the throttling element for minimum engine speed and both of said devices regulating independently the throttling element from the minimum speed to the maximum speed.

4. In an automobile, the combination with an explosion engine throttling element, of a movable hand throttle regulating device adapted to regulate the throttling element for minimum speed of the engine and a foot operated throttle regulating device, the hand and foot devices adapted to independently regulate the throttle from minimum to maximum speed.

5. In an automobile, the combination with an explosion engine throttling element, of a movable hand throttle regulating device, and a foot operated throttle regulating device, each of said devices arranged to operate the throttling element from minimum to maximum positions, the foot operated device operating the throttling element from minimum to maximum independent of the hand device.

6. In an automobile, the combination with an explosion engine throttling element, of a movable hand throttle regulating device and a movable foot operated throttle regulating device, the foot device regulating the throttling element from minimum to maximum without moving the hand device, and the hand device adapted to regulate the throttle element from minimum to maximum conjointly with the foot device.

7. In an automobile, the combination with an explosion engine throttling element, of a movable hand throttle regulating device, and a movable foot operated throttle regulating device, one of said devices regulating the throttling element from minimum to maximum independent of the other device, and both devices adapted to simultaneously and conjointly regulate the throttling element from minimum to maximum.

8. In an automobile, the combination with an explosion engine throttling element, of a movable hand throttle regulating device, and a movable foot operated throttle regulating device, each of said devices adapted to regulate the throttling element from minimum to maximum and both said devices independent of any braking element whereby either of said elements may be operated to open or close the throttling element independent of the braking element.

In testimony whereof I affix my signature in presence of two witnesses.

ALEXANDER WINTON.

Witnesses:
W. J. WARD,
ERLA LICHTENBERGER.